(12) United States Patent
Veit (10) Patent No.: US 7,831,602 B2
(45) Date of Patent: Nov. 9, 2010

(54) METHOD FOR COMPARING SEARCH PROFILES

(75) Inventor: Daniel Veit, Giessen (DE)

(73) Assignee: Siemens Aktiengesellschaft, Munich (DE)

( * ) Notice: Subject to any disclaimer, the term of this patent is extended or adjusted under 35 U.S.C. 154(b) by 1472 days.

(21) Appl. No.: 10/333,250

(22) PCT Filed: Jun. 29, 2001

(86) PCT No.: PCT/DE01/02407

§ 371 (c)(1),
(2), (4) Date: Jul. 1, 2003

(87) PCT Pub. No.: WO02/06974

PCT Pub. Date: Jan. 24, 2002

(65) Prior Publication Data

US 2004/0030680 A1   Feb. 12, 2004

(30) Foreign Application Priority Data

Jul. 17, 2000   (DE)   ................................. 100 34 694

(51) Int. Cl.
*G06F 17/30* (2006.01)
(52) U.S. Cl. ........................................ 707/752; 707/754
(58) Field of Classification Search ................ 707/1–10, 707/100, 200, 752, 754
See application file for complete search history.

(56) References Cited

U.S. PATENT DOCUMENTS

| | | | |
|---|---|---|---|
| 5,794,227 A | | 8/1998 | Brown |
| 6,366,956 B1 * | | 4/2002 | Krishnan .................... 709/223 |
| 6,701,313 B1 * | | 3/2004 | Smith ............................ 707/6 |
| 7,502,748 B1 * | | 3/2009 | Baldwin et al. ................ 705/9 |
| 2001/0014868 A1 * | | 8/2001 | Herz et al. .................... 705/14 |
| 2001/0039508 A1 * | | 11/2001 | Nagler et al. ................. 705/11 |

FOREIGN PATENT DOCUMENTS

WO      WO 99/10819      3/1999

OTHER PUBLICATIONS

Subrahmanian et al., "Heterogeneous Active Agents", The MIT Press, pp. 29-74.
Sycara et al., "Interoperability among Heterogeneous Software Agents on the Internet", The Robotics Institute, Carnegie Mellon University, Pittsburgh, USA, Oct. 1998, pp. 3-35.
Sycara et al., "Dynamic Service Matchmaking Among Agents in Open Information Environments", Sigmod Record, vol. 28, No. 1, Mar. 1999, pp. 47-53.
Kuokka et al., "Integrating Information via Matchmaking", JIIS, 6, pp. 261-279, 1996.

* cited by examiner

*Primary Examiner*—Marc R Filipczyk
(74) *Attorney, Agent, or Firm*—Staas & Halsey LLP (57) ABSTRACT

The invention relates to a method for automatically comparing search profiles. According to the method, a search profile is compared with one or several offered profiles that are stored in a database. The individual profiles are subdivided in to data fields, in which the information to be compared is saved. Different types of data fields are provided within each profile and the individual profiles have the same structure. During the comparison of a search profile with an offered profile, at least two different types of data fields comprising different comparison functions are compared. A final comparison value is calculated from the interim comparison values that are obtained in this way. According to the inventive method, different comparison functions are thus used for the different types of data fields. This allows a substantially more individual comparison of information than can be obtained using conventional method.

20 Claims, 8 Drawing Sheets

FIG 1

| Variable | Basic data field | Description |
| --- | --- | --- |
| $\tau_1$ | Keyword | Noun in the English language |
| $\tau_2$ | Verb-noun expression | Special type: comprising a verb and one or two nouns |
| $\tau_3$ | Plain text | Any combination of words, special characters and numbers |
| $\tau_4$ | Number | Natural or real number |
| $\tau_5$ | Interval | A field arrangement with two entries $v_1$, $v_2$ where $v_i \in \{-maxreal,\ldots,maxreal\}$ or $v_i \in \{-maxint,\ldots,maxint\}$ where $i = 1,2$ |
| $\tau_6$ | Date interval | Field arrangement with two elements of the D.M.Y. type, where D.M.Y is a valid date. |
| $\tau_7$ | Time | Field arrangement Y:D:H:M:S:Ms, where Y:D:H:M:S:Ms is a valid time with years, days, hours, minutes, seconds and milliseconds. |
| $\tau_8$ | Name | Any proper name |

FIG 2

| Data field | Type | Description |
|---|---|---|
| Profile type | t | Search profile or offer profile |
| Title | $\tau_1$ | Brief description in the form of verb-noun expression |
| Keywords | $\{\tau_i\}$ | Set of keywords |
| Detailed description | $\tau_3$ | Description in the form of plain text |
| Costs | $\tau_5$ | Details of the minimum and maximum costs |
| Dates | $\tau_6$ | Estimated start and end date |
| Duration | $\tau_7$ | Duration of the offered service |
| Subscribers | $\tau_8[1:2]^*$ | Names of the subscribers offering the service |

FIG 4

FIG 5a $d_1$ := This group is specialized in implementing agent systems. A main issue is the analysis and design of customer specific solutions which can be scaled. Dynamic database accesses and workflow optimizations are solved with a underlying agent society. Open and closed agent applications can be customized.

$d_2$ := We are looking for a team to implement an application of distributed decision making based on agent technology. The solution should be able to access databases which already exist in our system. The language of the implementation should not be domain specific and the portability should be guaranteed.

FIG 5b $DS_1$ = (access, 1, agent, 2, analysis, 1, applicaton, 1, close, 1, custom, 2, database, 1, design, 1, dynamic, 1, group, 1, implement, 1, issue, 1, main, 1, open, 1, optimize, 1, scale, 1 society, 1, solution, 1, solve, 1, specialize, 1, specific, 1, system, 1; underlie, 1, workflow, 1)

$DS_2$ = (access, 1, agent, 1, applicaton, 1, base, 1, database, 1, decision, 1, distribute, 1, domain, 1, exist, 1, guarantee, 1, implement, 2, language, 1, look, 1, portability, 1, solution, 1, specific, 1, system, 1, team, 1, technology, 1)

FIG 5c

| Tarm | $df_j$ | $\omega_{1j}$ | $\omega_{2j}$ | Tarm | $df_j$ | $\omega_{1j}$ | $\omega_{2j}$ |
|---|---|---|---|---|---|---|---|
| access | 20 | - | - | language | 10 | 0 | 0,30 |
| agent | 2 | 2 | 1 | look | 14 | 0 | 0,15 |
| analysis | 3 | 0,82 | 0 | main | 11 | 0,26 | 0 |
| application | 20 | - | - | open | 8 | 0,40 | 0 |
| base | 5 | 0 | 0,60 | optimize | 4 | 0,70 | 0 |
| close | 7 | 0,46 | 0 | portability | 4 | 0 | 0,70 |
| custom | 4 | 0,70 | 0 | scale | 3 | 0,82 | 0 |
| database | 2 | 1 | 1 | society | 2 | 1 | 0 |
| decision | 3 | 0 | 0,82 | solution | 3 | 0,82 | 0,82 |
| design | 4 | 0,70 | 0 | solve | 4 | 0,70 | 0 |
| distribute | 10 | 0 | 0,30 | spezialize | 1 | 1,30 | 0 |
| domain | 9 | 0 | 0,35 | specific | 3 | 0,82 | 0,82 |
| dynamic | 5 | 0,60 | 0 | system | 10 | 0,30 | 0,30 |
| exist | 5 | 0 | 0,60 | team | 2 | 0 | 1 |
| group | 1 | 1,30 | 0 | technology | 10 | 0 | 0,30 |
| guarantee | 7 | 0 | 0,46 | underlie | 3 | 0,82 | 0 |
| implement | 5 | 0,60 | 1,20 | workflow | 1 | 1,30 | 0 |
| issue | 10 | 0,30 | 0 | | | | |

FIG 6

| Name of variable | Type of variable | Meaning |
|---|---|---|
| Title | Plain text | Brief description |
| Offered services | Vector of key terms | e.g. "Market research" |
| Descriptors | Vector of key terms | Classification of the competences by typed strings |
| Competence description | Plain text | Description of the competences |
| Publications | Plain text | WWW pages, links to completed projects |
| Author and address | - | Telephone, E-mail address, name and postal address |

METHOD FOR COMPARING SEARCH PROFILES

CROSS REFERENCE TO RELATED APPLICATIONS

This application is based on and hereby claims priority to PCT Application No. PCT/DE01/02407 filed on 29 Jun. 2001 and German Application No. 100 34 694.4 filed on 17 Jul. 2000, the contents of which are hereby incorporated by reference.

BACKGROUND OF THE INVENTION

The invention relates to a method for comparing two search profiles.

Methods for automatically comparing and assessing search profiles are used, for example, in search engines on the Internet, in order to assess the individual possible results investigated by the search engines for their relevance with regard to the entered search terms and, if appropriate, to display them as a relevant result. If a plurality of results are found, then these are sorted on the basis of decreasing relevance, and are displayed to the user in the appropriate sequence.

A method for automatically comparing and assessing information, which is referred to as COINS (COmmon INterest Seeker) is known from the publication by D. Kuokka and L. Harada, Integrating Information via Matchmaking, Journal of Intelligent Information Systems (JIIS) 6(2/3), pages 261-279, 1996. This method allows plain texts to be compared, that is to say text details with any desired wording. The plain texts are in this method converted into document vectors, and these document vectors are compared and assessed in a search. This is done by using an inverse algorithm relating to the document frequency (term frequency-inverse document frequency algorithm).

The publications K. Sycara, J. Lu, M. Klusch and S. Widoff, Dynamic Service Matchmaking among Agents in Open Information Environments, Journal ACM SIGMOND Record, Special Issue on Semantic Interoperability in Global Information Systems, A. Ouksel, A. Sheth (Eds.), 1999, and K. Sycara, J. Lu, M. Klusch Interoperabilityamong Heterogeneous Software Agents on the Internet, CMU-RJ-TR-98-22, The Robotics Institute Carnegie Mellon University, Pittsburgh, October 1998 relate to a computer language which allows a method for automatically comparing and assessing information to be carried out by heterogeneous agent systems in an open environment such as the Internet. An open environment means that the agents need not all know each other. This language is called Larks (Language for Advertisement and Request for Knowledge Sharing). The comparison process in Larks is subdivided into the following five individual steps:

1. Those offered information units from a data bank are compared with the request in the same or a similar context in a context comparison process.

2. The request is compared with the information units selected by the context comparison in three step elements of a syntax comparison process:

2.1. The search profile and the offered information units are compared using a specific weighting method (term frequency-inverse document frequency weighting).

2.2. The number and the declaration of the input and output variables and of the input and output functions are compared in a similarity comparison process.

2.3. The variable types of the input and output variables are compared in a signature comparison process.

3. A check is carried out in a semantic comparison process to determine whether the input and output functions of a pair comprising a search request and an information offer are comparable.

This known method attempts to achieve as good an assessment as possible, that is to say an assessment which is as similar as possible to the assessment by a human being. Different major items are set for this purpose in the individual assessment steps. The individual assessment steps are in each case carried out sequentially, with all the information from the search request and all the information from one of the offered information units in each case being evaluated separately in each step.

Furthermore, so-called multimatchmakers are known, that is to say methods, which can carry out a plurality of separate methods for automatically comparing and assessing information, and for averaging the respective results to form an overall result. Such multimatchmakers in principle operate in the same way as the known methods for comparing and assessing information. Further similar methods for comparing and assessing information, which carry out some of the comparison and assessment process, are called up only if a predetermined search request cannot be coped with in the required time period. This also allows complex search requests to be processed quickly.

SUMMARY OF THE INVENTION

One aspect of the invention is based on the object of providing a method for automatically comparing and assessing information, by which an assessment is possible which is very similar to the assessment by a human being, and which is achieved with little computation effort.

In one method for comparing a first search profile with at least one second search profile, with the search profiles each having a plurality of data fields and the data fields of the first search profile and of the second search profile each comprising at least two data fields of a different type, which is the same for the respective data field in the first and in the second search profile vector, the at least two different types of data fields are compared using different comparison functions during the comparison of the first search profile with the second search profile.

In the method for automatically comparing and assessing information, a search profile which is predetermined by the user is compared with an offer profile which is stored in a data bank. The profiles are in each case subdivided into a specific number of data fields, in which the information to be compared is stored. Each profile has at least two different types of data fields. The profiles to be compared each include the same types of data fields.

During the comparison of a search profile with an offer profile, the at least two different types of data fields are compared using different comparison functions, and the respective comparison is assessed using a provisional comparison value. A final comparison value is calculated from the provisional comparison values.

The method thus compares profiles which are structured into individual data fields. One aspect of the invention uses different comparison functions for the different types of data fields, by which comparison functions provisional comparison values are calculated. This allows the contents of the individual data fields to be compared and assessed on a type-specific basis. A final comparison value is calculated from the provisional comparison values.

The invention may result in the individual data fields being compared on a type-specific basis, and in the results of the individual comparisons, that is to say the provisional comparison values, being combined to form a final comparison value.

The individual data fields are compared on a type-specific basis by the method, thus resulting in considerably more realistic results than with the previously known methods. Since only specific data fields can be processed by each of the individual comparison functions and the entire amount of data for a profile need not always be processed, the individual comparison functions can be produced easily and can be implemented by a short program section. This considerably simplifies the implementation of the method for a specific application and, furthermore, the method can be carried out quickly, since the individual short program sections process only specific tasks that are required for comparison.

According to one preferred embodiment, one or more complex data fields are provided, which each relate to a plurality of data fields. If these further data fields are in turn complex data fields, then they in turn relate to a plurality of data fields. Basic data fields, in which the information for the profiles is stored, are arranged at the end of such a chain. The data fields are arranged in different levels, with a complex data field which relates to a plurality of further data fields being arranged in the respective level that is superior to the data fields to which it relates.

According to one preferred embodiment, document vectors are produced for comparing data fields which contain plain texts, with the individual elements of the vectors being weighting factors which describe the relevance of the elements, and a Euclidean interval between the two document vectors being calculated as a provisional comparison value. The calculation of a Euclidean interval satisfies the requirements for a metric distance function, namely that two identical vectors are separated by 0, and that the distance between a first and a second vector is identical to the distance between the second and the first vector, and that the distance between the first and the third vector is less than or equal to the distance between the first and a second vector plus the distance between the second and the third vector.

The method can very advantageously be integrated in an agent system. This agent system has at least three types of agents, namely a search agent, an offer agent and a comparison agent which, in response to a request by the search agent, compares and assesses the profiles which are stored in the search agents and in the offer agents. The agent system is preferably an open agent system, that is to say further agents, in particular offer agents, can be added. The agents are preferably mobile agents, which means that they can be active at various locations in a computer network and can change their location in the computer network.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

Figure 2:
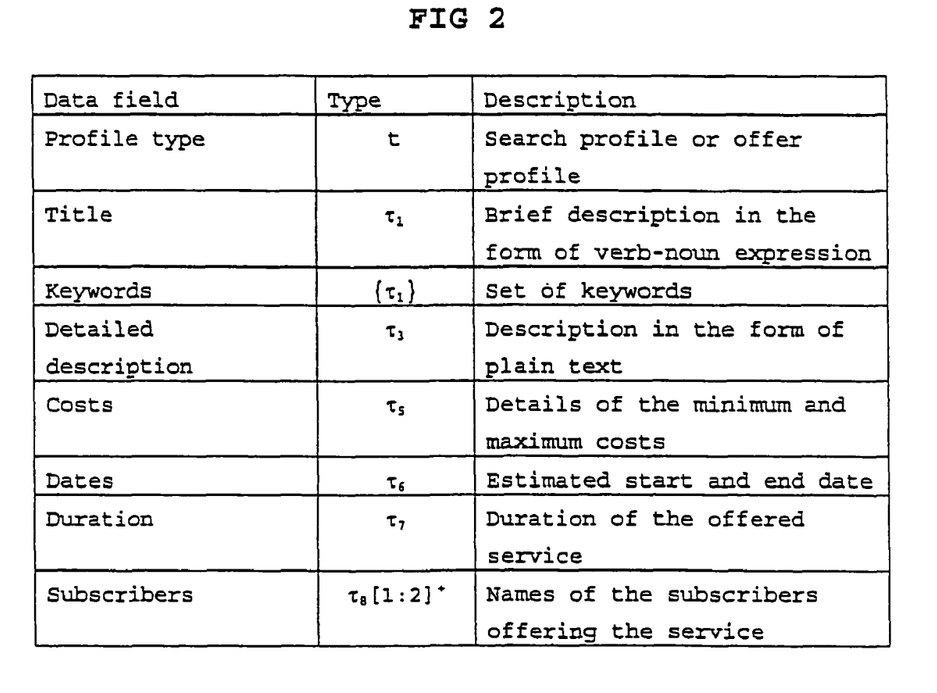
FIG. 2 shows a profile description in tabular form.

In the method for automatically comparing and assessing information, a search profile is compared with an offer profile which is stored in a data bank. FIG. 2 shows a profile description for one exemplary embodiment. This profile description has eight data fields, of which the left-hand column in FIG. 2 indicates the title of the respective data field, the center column contains the variable symbol for the data field, and the right-hand column contains a brief description of that data field.

In principle, a distinction is drawn between an offer profile and a search profile for an automatic comparison method. The profile description of the offer profile and of the search profile have matching structures. They differ only in the content of their profile type data field, in which details as to whether this is an offer profile or a search profile are stored. The profile type t data field is a Boolean data field, whose content may be either 0 or 1. The further data fields are the title, the keywords, the detailed description, the costs, the dates, the duration and the subscribers. The title data field contains a brief description of the offered or sought service in the form of a so-called verb-noun expression. The use of such verb-noun expressions is known from V.S. Subrahmanian (publisher), Piero Bonatti, Jürgen Dix, Thomas Eiter, "Heterogeneous Active Agents", Cit Press; ISBN: 0262194368. The keywords data field contains a set of keywords. For the purposes of the present description, a set is an unorganized collection of elements of the same type, for example words, real numbers, integers or the like. The variable in a set is shown between two curved brackets.

The detailed description data field contains a plain text, in which the service being offered or sought is described.

The costs data field contains details about the minimum or maximum costs to be expected. The costs data field thus represents an interval.

The duration data field contains the time period which is consumed in order to carry out the offered service.

The subscribers data field contains a list of the names of those subscribers who are offering, or are the to be offering, that service. A list is represented by a superscript plus sign. The expression in brackets [1:2] means that each list item is composed of two individual elements, namely the first name and the surname. The data field $\tau_8[1:2]^+$ and the data field $(\tau_1)$ are complex variables, which will be explained in more detail below.

Figure 3:
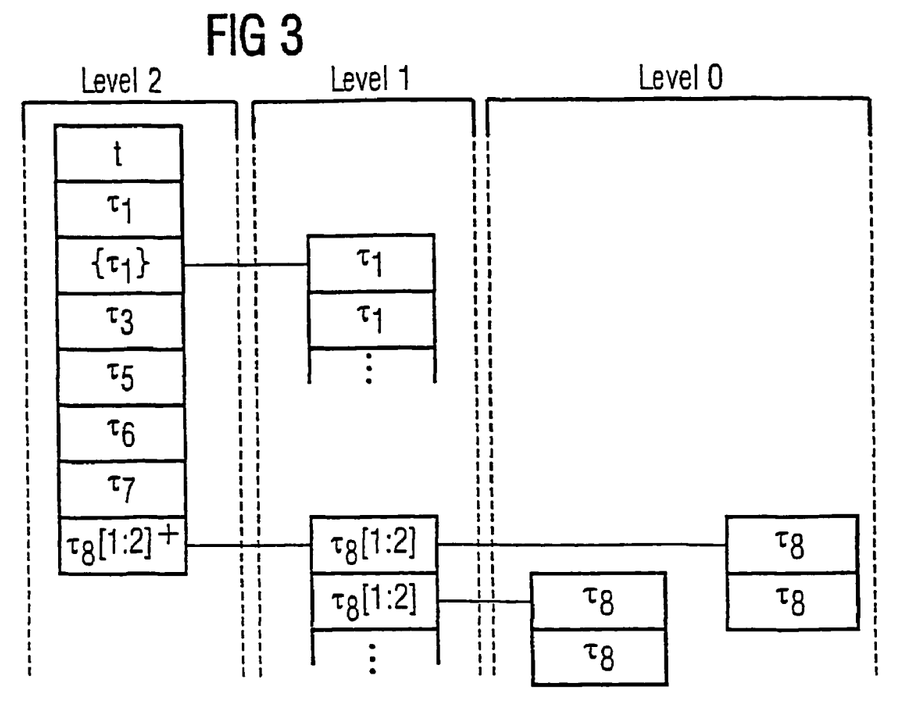
FIG. 3 shows a profile structure in the form of a block diagram.

FIG. 3 shows the structure of the profile description from FIG. 2. The profile description is subdivided into three levels (Level 0, Level 1 and Level 2). Level 2 is the highest level, in which the data fields shown in FIG. 2 are arranged. The complex data fields $\tau_1$ and $\tau_8[1:2]^+$ each relate to further data fields which are represented by corresponding variables in the subordinate level. For example, a plurality of data fields $\tau_1$ are arranged in that level, and a keyword is stored in each of them. The complex variable $\tau_1$ thus relates to the list of keywords stored in Level 1. The complex data field $\tau_8[1:2]^+$ of subscribers relates to a list of further data fields. The elements in this list are field arrangements [1:2] which each include two names, the first name and the surname. In principle, a field arrangement includes a specific number of elements of the same type. The field arrangements $\tau_8[1:2]^+$ thus relate to further data fields which are arranged in Level 0 and each have a single-word entry, namely the first name or the surname. Two such data fields $\tau_8$ are in each case combined to form one such field arrangement.

The data fields which relate to further data fields in a subordinate level are referred to as complex data fields. The other data fields are basic data fields.

The information for the respective profile is stored in the basic data fields. A plurality of basic data fields are projected over the complex data fields, in the form of sets, lists, field arrangements or registers (records), onto a single field arrangement in the topmost level. Registers are formed in a similar way to field arrangements from a predetermined number of successive elements, which in turn may be composed of different types.

The tree structure, as described above, by which the complex data fields which branch off from a superior level to a subordinate level result in there being only a single data field in the topmost level (in this case Level 2) for each terminology unit.

Figure 1:
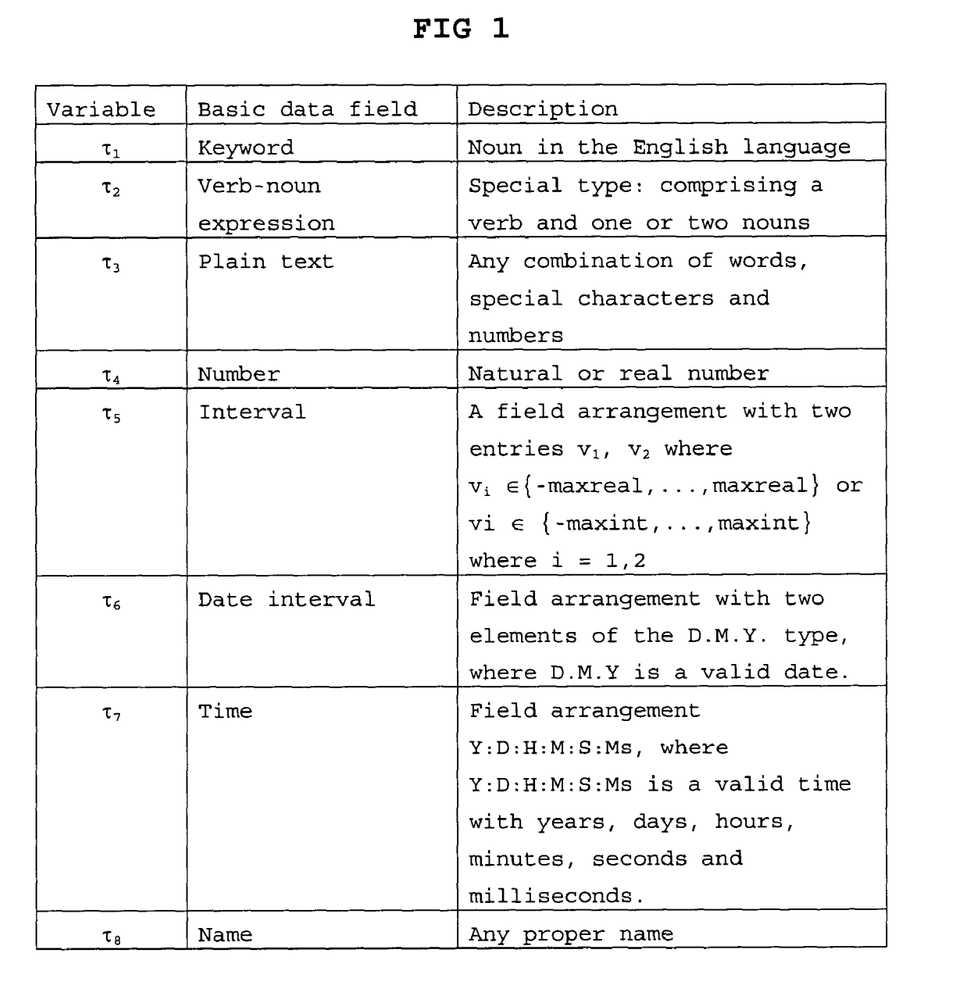
FIG. 1 shows a table illustrating the various basic data fields.

FIG. 1 shows a list of the basic data fields. Column 1 shows the variable names of the basic data fields $\tau_1$ to $\tau_8$. The center column shows the names of the corresponding basic data fields, and the right-hand column shows a brief description of the content.

The present exemplary embodiment is designed to compare language elements in the English language. The keywords $\tau_1$ are therefore nouns in the English language. The verb-noun expressions $\tau_2$ are expressions which are composed of a verb and at least one noun. A plain text $\tau_3$ comprises any desired combination of words, letters and numbers. A number $\tau_4$ is either an integer or a real number. An interval $\tau_5$ is a field arrangement of the $V_1$, $V_2$ type, where $V_1$ and $V_2$ are the boundaries of the interval in the form of integers or real numbers. A date interval $\tau_6$ is a field arrangement which has two dates D.M.Y., which in each case represent the date boundary of the field arrangement. A time $\tau_7$ is a field arrangement with the details Y:D:H:M:S:$M_s$, where Y is the year, D the day, H the hours, M the minutes, S the seconds and $M_s$ hundredths of seconds. A name $\tau_8$ is any desired suitable name for a person.

Figure 4:
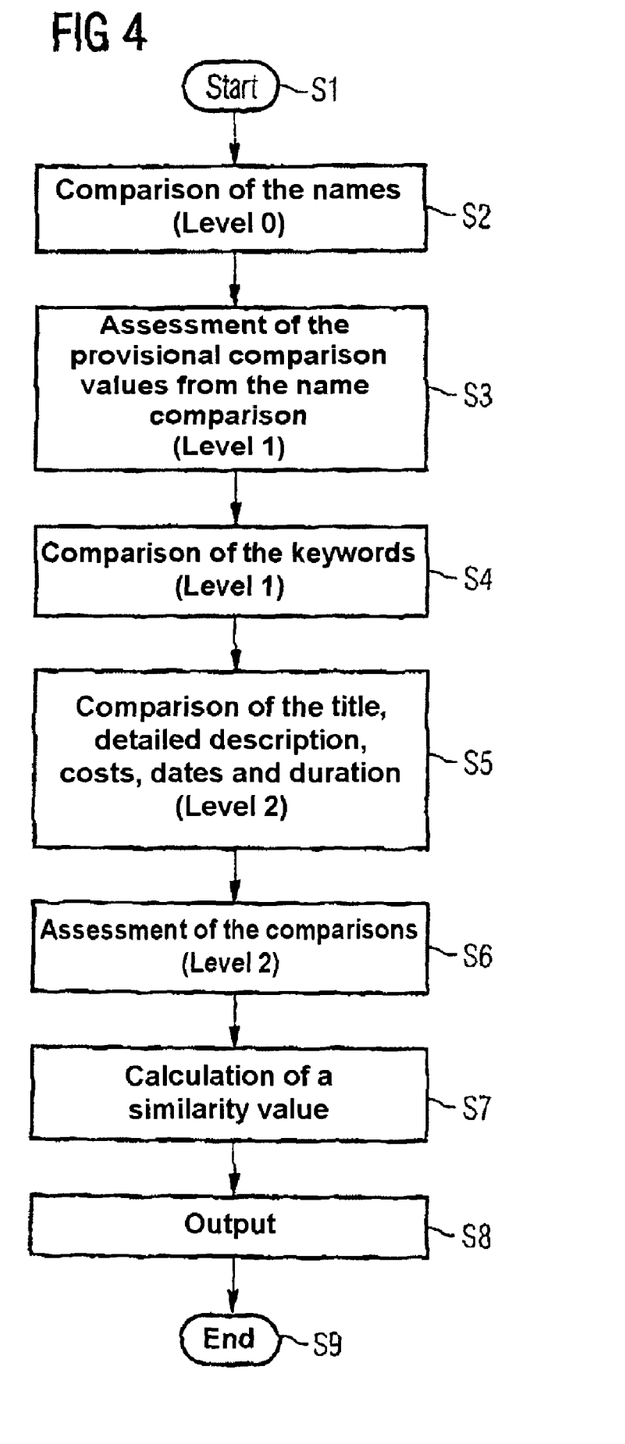
FIG. 4 shows the method for automatically comparing and assessing information in the form of a flowchart.

FIG. 4 shows the sequence of the method, schematically, for the profile structure shown in FIG. 3.

The method starts with step S1. In step S2, the subscriber data fields are compared by a name comparison function. If two names match, that is to say two fields arrangements composed of a first name and a surname match, then the name comparison function which calculates an interval as the provisional comparison value results in the interval 0. If the names to be compared do not match, then the name comparison function results in the interval 1 as the provisional comparison value. In the comparison of the subscriber data fields in step S2, one field arrangement from the search profile is in each case compared with all the corresponding field arrangements in the offer profile. This comparison is therefore carried out between the field arrangements in Level 0. If a field arrangement in the search profile matches one of the field arrangements in the offer profile, then the value 0 is entered as the provisional comparison value in Level 1 of the search profile, in the data field $\tau_8[1:2]$ associated with the field arrangement that has been found. If it has not been possible to find this field arrangement (=first name and surname), then the value 1 is entered in the corresponding data field in Level 1. After completion of step S2, all the data fields $\tau_8[1:2]$ are provided with a provisional comparison value.

In step S3, the provisional comparison values which are associated with the names are assessed. This is generally done by forming a weighted mean. Since the elements to be compared are always of the same type, they are equivalent and are therefore all given the weighting 1. A mean value of the values entered in the complex data field $\tau_8[1:2]$ is thus formed in each case. This mean value is a second-order provisional comparison value, which is entered in the complex data field for the name list $\tau_8[1:2]^+$ in Level 2.

In the next step S4, the data fields $\tau_1$ which contain the keywords in the search profile are compared with the corresponding data fields in the offer profile. The comparison function for comparing the keywords is designed such that each keyword in the search profile is compared with each keyword in the offer profile and, if the keywords in the offer profile do not contain a keyword from the search profile, the value 1 is stored. Otherwise, the value 1 is stored. The mean value of these values is calculated as the provisional comparison value, and this is entered in the data field in the list of keywords $\{\tau_1\}$.

Steps S3 and S4 are carried out in Level 1.

In the next step S5, the contents of the data fields title $\tau_2$, detailed description $\tau_3$, costs $\tau_5$, dates $\tau_6$ and duration $\tau_7$ are compared with one another.

The comparison function for comparing the title $\tau_2$ is a known comparison function for comparing verb-noun expressions.

Figure 5A:
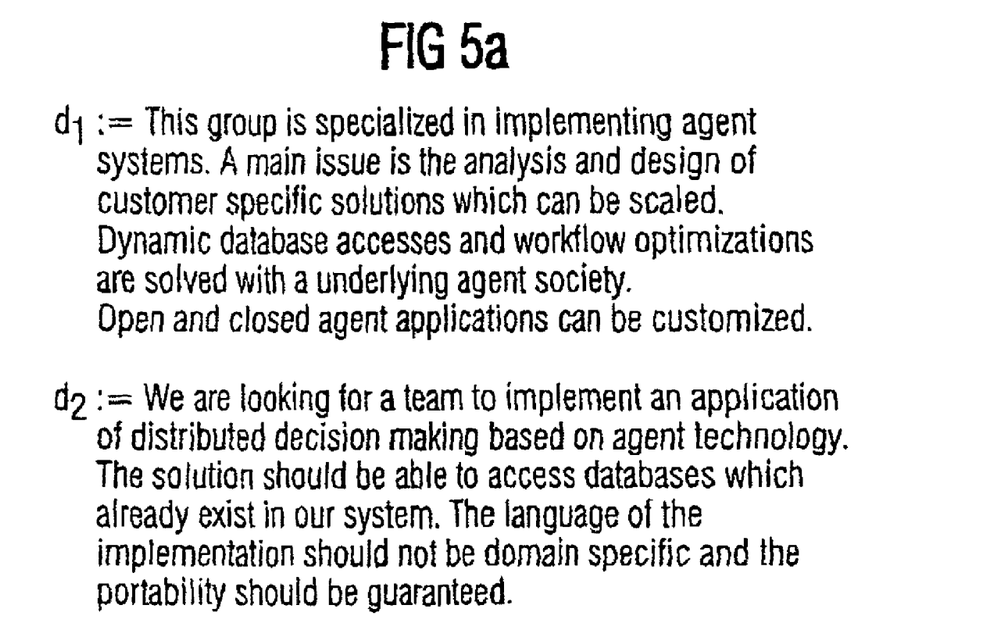
FIG. 5a shows two plain texts to be compared.

The comparison function for comparing the detailed description $\tau_3$ data field is a comparison function for comparing plain texts. FIG. 5a shows two examples of plain texts $d_1$, $d_2$, which each comprise a text in the English language. These plain texts are first of all transformed into data records $DS_1$ and $DS_2$, into which all those words which are not stop words are transferred from the plain texts. Stop words are words which have little information content. Lists of known stop words exist. In the present case, the following words are assessed as stop words:

this, is, in, a, the, and, off, can, be, are, with, we, for, to, an, able, which, our, not, shout, already, make.

Figure 5B:
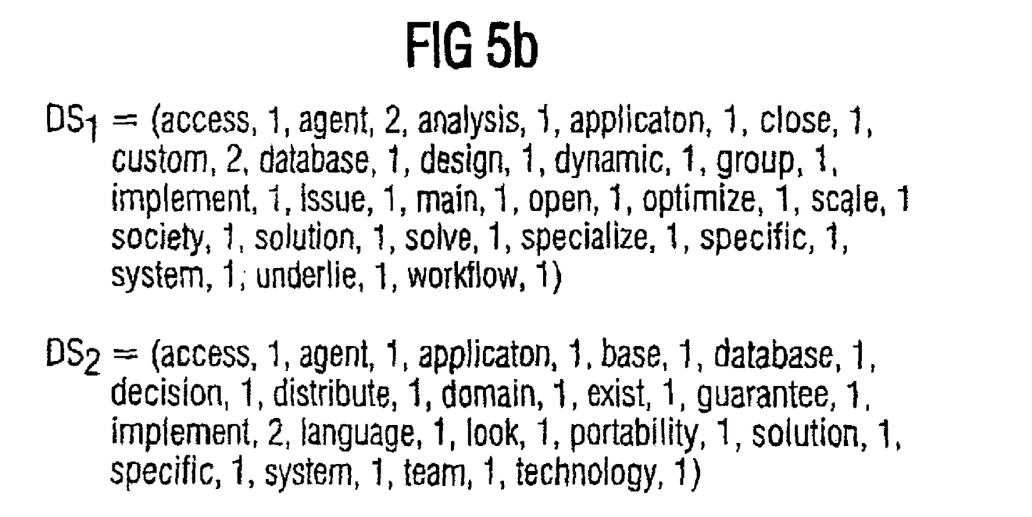
FIG. 5b shows two data records which are derived from the plain texts shown in FIG. 4a, FIG. 5c shows assessment results for the individual words in the data records in tabular form.

The individual words are each followed by an indication of their frequency in the corresponding plain texts in the data records $DS_1$ and $DS_2$. The individual words are sorted in alphabetical order in the data records.

In order to compare the plain texts, the words in the data records must be provided with weighting factors. In order to calculate the weighting factors, a so-called inverse document frequency $idf_j$ is first of all calculated, which is defined as follows:

$$idf_f := \log \frac{N}{df_j},$$

where N is the total number of all the documents and $df_j$ is the number of documents which contain the word j. In the following exemplary embodiment, each plain text represents one document. Overall, in addition to the two plain texts shown in FIG. 5a, there are another 18 plain texts for a further 18 offer profiles. The total number of documents N is thus 20.

The inverse document frequency is used to weight those words which occur very frequently with a value which tends to 0, and those words which occur in only a few documents are weighted with the value which tends to 1. This results in words which occur rarely in the inverse document frequency $idf_j$ being weighted more strongly than frequent words. Rare words generally have more information content than frequent words.

In addition to the inverse document frequency, the frequency $tf_{ij}$ of the words j in the documents i is also taken into account. The weighting factor $w_{ij}$ thus becomes the product of the frequency $tf_{ij}$ and of the inverse document frequency $idf_j$ ($w_{ij}=tf_{ij} idf_j$).

Figure 5C:
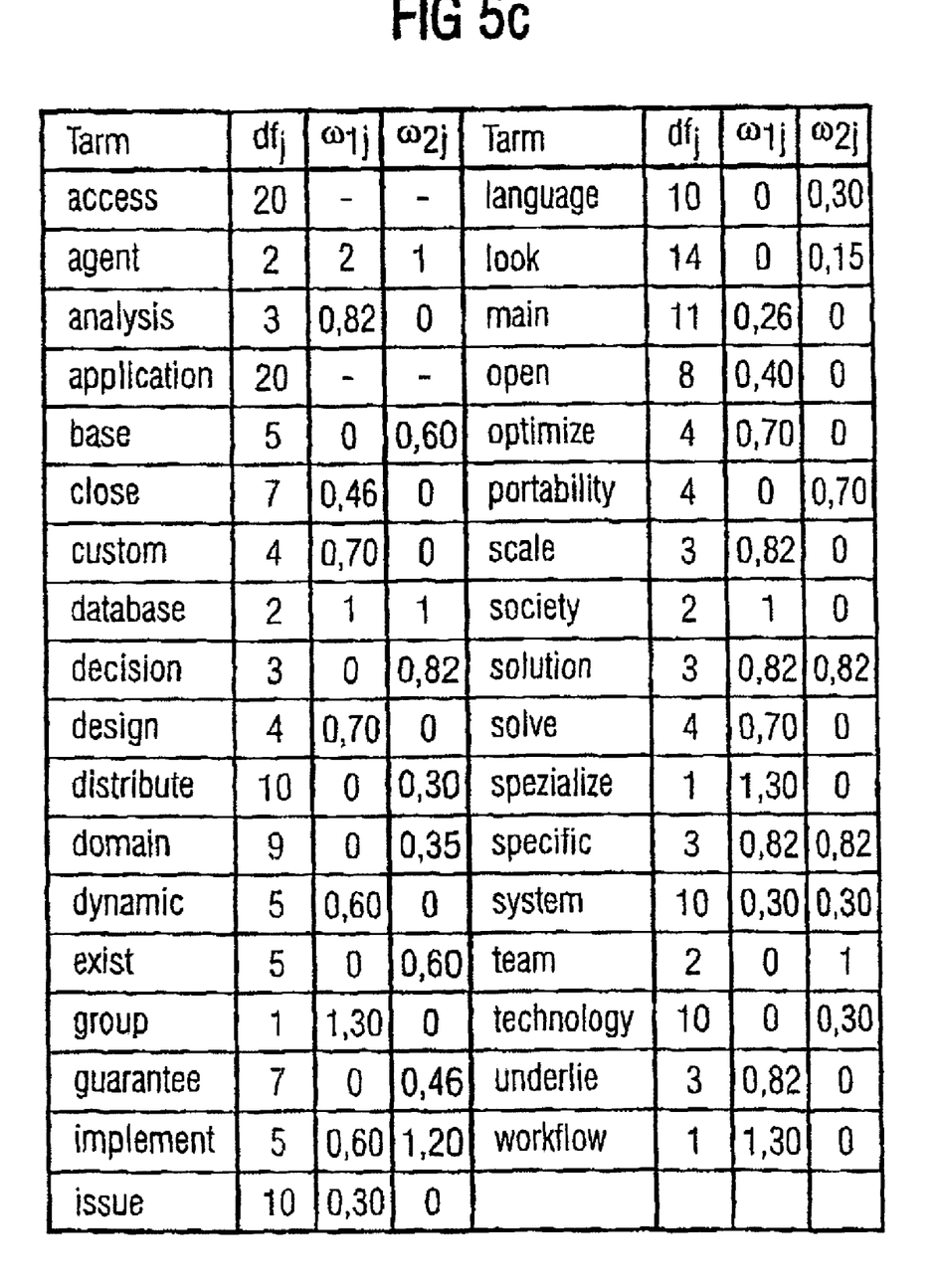
Figure 6:
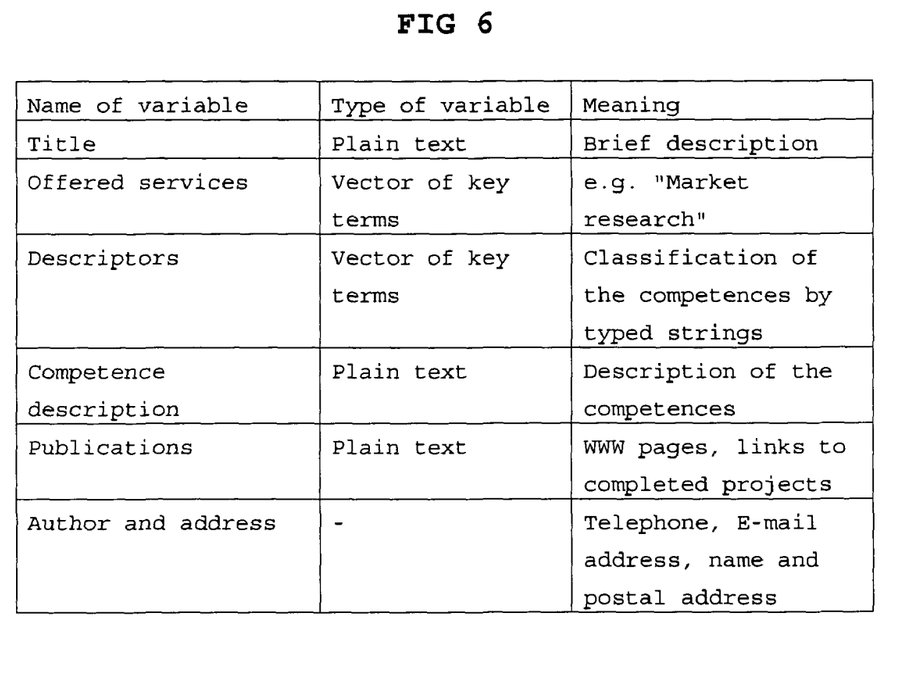
FIG. 6 shows an example of an offer description for a cooperation market.

The inverse document frequency $df_j$ and the weighting factors $w_{1j}$ and $W_{2j}$ for the words in the data record shown in FIG. 5b are listed in the table in FIG. 5c.

The weighting factors $w_{1j}$ and $w_{2j}$ in each case form elements of the document vectors $DV_1$ and $DV_2$.

The interval between the corresponding document vectors $DV_1$ and $DV_2$ is calculated by comparing two plain texts. The interval between the two vectors is calculated from the Euclidean interval in accordance with the following formula:

$$d(DV_i, DV_1) = \sqrt{\sum_{j=1}^{k} (w_{i,j} - w_{l,j})^2}$$

The Euclidean norm satisfies all the preconditions for a metric interval:
the interval between two identical vectors is 0.
The interval between a first vector and a second vector is equal to the interval between the second vector and the first vector. This means that the interval calculation is symmetrical.
The interval between a first vector and a third vector is less than the sum of the intervals between the first vector and a second vector and between the second vector and the third vector.

The only way to ensure that a sensible interval is always determined is for the interval calculation to satisfy this precondition.

Instead of calculating the interval between the two document vectors by a Euclidean interval, it is also possible, as is done in known comparison methods, to calculate the intervals between the two vectors by the cosine between the two vectors.

The comparison function for comparing the data fields which contain the costs is a comparison function for comparing intervals. The distance between two intervals $i_1, i_2$ which are defined by real numbers $i_1=[l_1,r_1]$ and $i_2=[l_2, r_2]$ is calculated in accordance with the following formula:

$$d(i_1, i_2) := \begin{cases} \frac{|l_1 - l_2| + |r_1 - r_2|}{|l_2 - r_1|} & \text{for } l_1 < l_2 < r_1 < r_2 \\ \frac{|l_2 - l_1| + |r_2 - r_1|}{|l_1 - r_2|} & \text{for } l_2 < l_1 < r_{21} < r_1 \\ \frac{|l_1 - l_2| + |r_2 - r_1|}{|l_2 - r_1|} & \text{for } l_1 < l_2 < r_2 < r_1 \\ \frac{|l_2 - l_1| + |r_1 - r_2|}{|l_2 - r_1|} & \text{for } l_2 < l_1 < r_1 < r_2 \\ \infty & \text{else} \end{cases}$$

Comparison functions which are known per se are used for calculating the interval in the date and the duration data fields.

In the present exemplary embodiment, no numbers are compared, for which reason no corresponding comparison functions are used for comparison either. A comparison function such as this can be provided, for example, very easily by determining the absolute value of the difference between the numbers to be compared.

The provisional comparison values which are determined from the comparison of the data fields $\tau_2, \tau_3, \tau_5, \tau_6$ and $\tau_7$ are stored. This completes step S5.

In step S6, the individual provisional comparison values relating to the data fields $\tau_1$ to $\tau_8$ in Level 2 are used to calculate a final comparison value. In this case, a weighted mean value is calculated, with the individual data fields being weighted to different extents depending on their significance. The result of the forming of this weighted mean value is a distance value which indicates the distance between the two profiles to be compared, the search profile and the offer profile.

Since, as a rule, a similarity value is desired rather than a distance value, the reciprocal of the distance value is formed (step S7). This similarity value represents the final comparison value and is output is step S8. The method is ended in step S9.

The final comparison value is used to sort the corresponding offer profile in a list of offer profiles on the basis of the calculated similarity to the search profile.

If, when initiating a search process, the user finds that he desires the most similar offer profiles, then the method and as described above is carried out for each offer profile, and the individual offer profiles are sorted on the basis of decreasing similarity to the search profile, and the most similar offer profiles are output to the user as the result.

The method may be in the form of a computer program for automatically comparing profiles. It is particularly advantageous for the method to be in the form of an agent system.

Agents are autonomous, cooperative software units which comprise code and data. They are autonomously functioning software units, which do not require any continuous interaction with the user. Both stationary and mobile agents exist.

Mobile agents are known, for example, from U.S. Pat. No. 5,603,031. Mobile agents are programs which may be active at different locations in a computer network and can change their location in the computer network.

Figure 7:
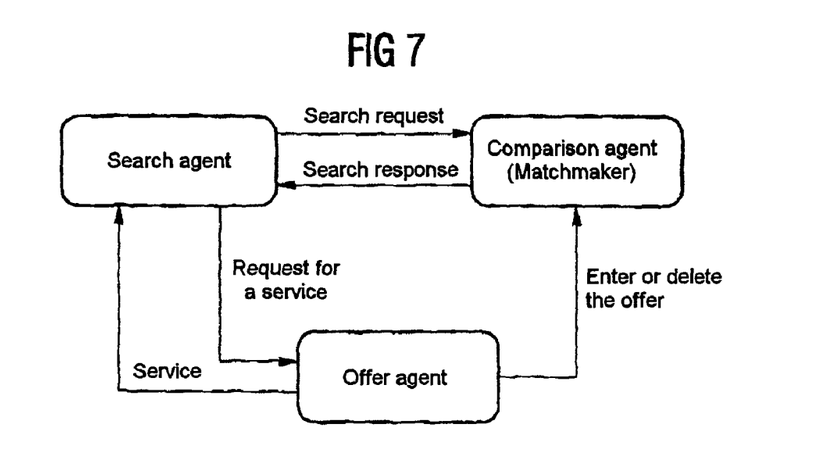
FIG. 7 shows an agent system in the form of a block diagram.

FIG. 7 shows, schematically, the sequence of the method by three agents. In this case, a comparison agent, a search agent and an offer agent are used. The comparison agent contains a data bank in which the offer agents that are known to it are stored, with their respective offer profiles. The offer agents may be entered in the appropriate data bank with their offer profile, and this offer profile can be deleted again if it no longer includes the appropriate offer.

A search agent which searches for a specific service uses a comparison agent and sends a search request to that comparison agent. The search request contains an appropriate search profile. This search profile compares the comparison agent with the offer profiles stored in its data bank and assesses them using the method described above. It transmits to the search agent an appropriate search response, which contains a list with the names of the relevant offer agents, with each offer agent being assessed by a comparison value.

The search agent can either pass on the search response to its original customer, or can send a request to provide the appropriate service to the offer agent which is associated with the best comparison value. The service can then be provided by the offer agent to the search agent, which passes it on to its customer.

Figure 8:
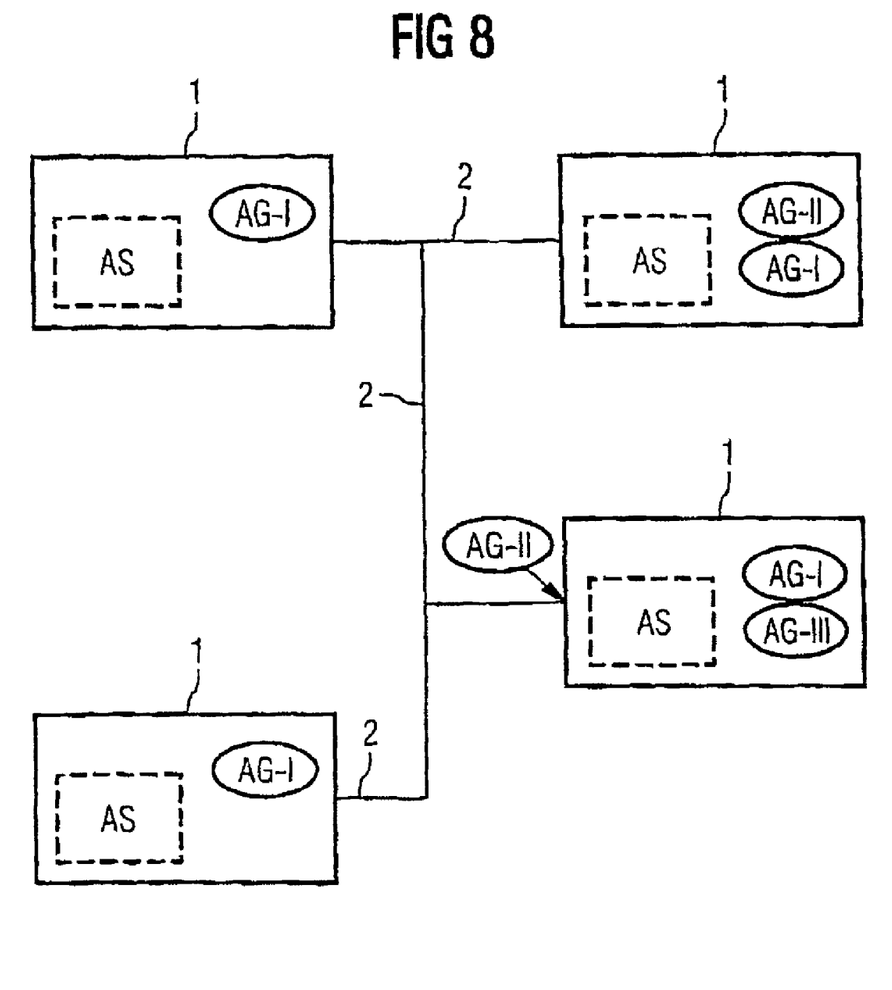
FIG. 8 shows a network for the connection of computers, on which the agent system shown in FIG. 6 is installed, in the form of a block diagram.

FIG. 1 shows, in a schematically simplified form, a network which includes one such agent system. The network has a plurality of computers 1, that are connected to one another via data lines 2. An agent system AG is installed in each of the individual computers 1. The network contains a plurality of mobile agents AG-I to AG-IV, which are either arranged at one of the computers 1 or move from one computer to another.

Each agent system has an agent platform which comprises service programs which an agent requires in order to make it possible for this to be carried out on the respective computer 1.

The agents AG-I are offer agents and the agents AG-II are search agents. The agent AG-III is a comparison agent. The offer profiles for the offer agents AG-I are stored in the comparison agent AG-III. A search agent AG-II can place a search request with the comparison agent AG-III, which responds to it with an appropriate search response.

The search agents can then further process the search response in the appropriate predetermined manner and, in particular, can pass it on to that user who is using a computer in the network.

The method may be in the form of a software product which is stored in a network, for example in the form of a comparison agent. The method may, however, also be stored on any desired electronically legible data medium or in a semiconductor memory in a computer, and can be caused to run in that computer.

The invention has been explained in relatively great detail above with reference to an exemplary embodiment. However, it is not restricted to the specific embodiment in the exemplary embodiment. The essential feature is that the individual profiles are structured by different types of data fields and that different comparison functions are applied to the different types of data fields. This results in a multidimensional assessment of the profiles to be compared. This multidimensional assessment of the profiles results in a highly individual assessment, which is very similar to the assessment by a human being. For example, within the scope of the invention, it is possible for the basic fields to be filled with contents other than those in the above embodiment. It is also possible to compare profiles with different structures, with one of the profiles being mapped onto a further profile whose structure matches the profile to be compared.

This additional mapping process allows the field of use of the method to be extended considerably. For example, it may be expedient to provide a relatively small profile with, for example, three to five different types of data fields, onto which any desired information units are mapped. These information units are then compared by the structured profiles associated with them.

The invention has been described in detail with particular reference to preferred embodiments thereof and examples, but it will be understood that variations and modifications can be effected within the spirit and scope of the invention.

The invention claimed is:

1. A computer-implemented method for comparing profiles, comprising:
   providing a plurality of offer profiles, each offer profile containing at least a first type of data field and a second type of data field;
   receiving a search profile from a user, the search profile containing at least the first and second types of data fields;
   comparing the offer profiles with the search profile to sort the offer profiles on the basis of decreasing similarity with the search profile, the offer profiles being compared with the search profile by comparing like data field types; and
   generating and storing a list of offer profiles sorted on the basis of decreasing similarity.

2. A computer-implemented method, comprising:
   storing an offer profile in a data bank;
   automatically comparing and assessing information where a search profile is compared with the offer profile;
   subdividing each profile into a specific number of data fields in which the information to be compared is stored, wherein each profile comprises at least two different types of data fields;
   comparing the profiles to sort the profiles on the basis of decreasing similarity, the profiles being compared by comparing data fields of the same type, the types of data fields being compared respectively using different comparison functions to produce respective provisional comparison values;
   determining a final comparison value from the provisional comparison values; and
   generating and storing a list of profiles sorted on the basis of decreasing similarity.

3. The method as claimed in claim 2, wherein the profiles have a number of levels, with a complex data field being provided in at least one of the levels and relating to a number of data fields in a subordinate level, where the complex data field is a variable into which a complex comparison value is inserted during the comparison, and where a complex comparison value is calculated from the data fields which are subordinate to the complex data field.

4. The method as claimed in claim 3, wherein the complex data field relates to basic data fields, with the information relating to the profiles being stored in the basic data fields.

5. The method as claimed in claim 4, further comprising:
   arranging the complex data field in an uppermost level, where a number of levels are arranged under a lowermost level, with the relationship between the complex data field in the uppermost level and the basic data fields not arranged in a level immediately below the uppermost level and produced via complex data fields which are arranged in levels between the uppermost level and the basic data fields.

6. The method as claimed in claim 2, further comprising:
   calculating the final comparison value by forming a weighted mean of the provisional comparison values.

7. The method as claimed in claim 2, wherein the provisional comparison values each represent an information interval whose value increases when a difference between the corresponding information items increases.

8. The method as claimed in claim 7, further comprising:
   calculating a final information interval to calculate the final comparison value from the provisional comparison values and to calculate a reciprocal value which forms a final value for use.

9. The method as claimed in claim 2, wherein the comparison functions compare and assess the two data fields, each containing a data item, a numerical value, a plane text, a keyword, an interval, a clock time, or a name.

10. The method as claimed in claim 2, wherein the comparison of the at least two different types of data fields, each comprising a plain text, using different comparison functions, comprise:

two plain texts are broken down into individual words, a data record is in each case produced for each plain text, and comprises all the words of each plain text that are not a stop word, each word in the data record is weighted in accordance with a corresponding relevance within the plain text and in accordance with the corresponding relevance within the data bank by a weighting factor ($w_{ij}$), with weighting factors of two data records being elements of one document vector ($DV_i$, $DV_j$), and calculation of an interval between two document vectors, with the interval representing a provisional comparison value.

11. The method as claimed in claim 10, further comprising:

calculating an Euclidean interval between the two document vectors ($DV_i$, $DV_j$) as the interval.

12. The method as claimed in claim 10, further comprising:

calculating a cosine between the two document vectors ($DV_i$, $DV_j$) as the interval.

13. The method as claimed in claim 2, further comprising:

using a K.O. criterion to monitor a provisional comparison result relating to a specific field in the profiles compared, and setting a final comparison result to a predetermined value irrespective of other comparison results when the provisional comparison result has a predetermined value.

14. The method as claimed in claim 2, wherein at least one comparison function has a threshold value criterion which sets the final comparison result to a predetermined value when the threshold value is overshot or undershot.

15. The method as claimed in claim 2, performing a comparison function to compare the two data fields each containing a number, where an absolute magnitude of a difference between the numbers of the two data fields is calculated as a comparison value.

16. The method as claimed in claim 2, performing a comparison function to compare the two data fields each containing an interval, with boundaries of the two intervals ($i_1$, $i_2$) being indicated by real numbers I and r ($i_1 = [l_1, r_1]$ and $i_2 = [l_2, r_2]$), and a comparison value $d(i_1, i_2)$ being calculated using the following formula:

$$d(i_1, i_2) := \begin{cases} \frac{|l_1 - l_2| + |r_1 - r_2|}{|l_2 - r_1|} & \text{for } l_1 < l_2 < r_1 < r_2 \\ \frac{|l_2 - l_1| + |r_2 - r_1|}{|l_1 - r_2|} & \text{for } l_2 < l_1 < r_2 < r_1 \\ \frac{|l_1 - l_2| + |r_2 - r_1|}{|l_2 - r_1|} & \text{for } l_1 < l_2 < r_2 < r_1 \\ \frac{|l_2 - l_1| + |r_1 - r_2|}{|l_2 - r_1|} & \text{for } l_2 < l_1 < r_1 < r_2 \\ \infty & \text{else} \end{cases}$$

17. The method as claimed in claim 2, performing a comparison function to compare the two data fields each containing a name, where the provisional comparison value is set to be equal to zero when the names to be compared match, or is set to be equal to infinity when the names differ.

18. A network connecting a number of computers with an agent system being installed with the computers and the network having a number of agents, comprising:

a comparison agent storing an offer profile in a data bank, automatically comparing and assessing information where a search profile is compared with the offer profile, subdividing each profile into a specific number of data fields in which the information to be compared is stored, wherein each profile comprises at least two different types of data fields, comparing the profiles to sort the profiles on the basis of decreasing similarity, the profiles being compared by comparing data fields of the same type, the types of data fields being compared respectively using different comparison functions to produce respective provisional comparison values, and calculating a final comparison value from the provisional comparison values;

a search agent making a search request to the comparison agent, where, in response, the comparison agent automatically compares and assesses offer profiles, which are stored in a data bank, with a search profile which is transmitted with the search request; and generating and storing a list of profiles sorted on the basis of decreasing similarity.

19. The network as claimed in claim 18, wherein the data bank, together with the offer profiles, is contained in the comparison agent.

20. The network as claimed in claim 18, wherein a number of offer agents are provided, which transmit an offer profile, which corresponds to an offer to the comparison agent for storage in the data bank or, when the offer is withdrawn, transmit a message to the comparison agent in order to delete the offer profile.

* * * * *